NO TDW FIELD

WITH TDW FIELD

INVENTORS.
WILLIAM D. MURRAY
ROBERT A. TRACY
BY
Edward J. Feeney Jr.
ATTORNEY

INVENTORS.
WILLIAM D. MURRAY
ROBERT A. TRACY
BY Edward J. Feeney Jr.
ATTORNEY

INVENTORS.
WILLIAM D. MURRAY
ROBERT A. TRACY
BY
Edward J. Feeney Jr.
ATTORNEY

Dec. 9, 1969 W. D. MURRAY ET AL 3,483,537

BLOCK ORIENTED RANDOM ACCESS MEMORY WITH A TRAVELING DOMAIN WALL FIELD

Filed Nov. 23, 1966 7 Sheets-Sheet 4

INVENTORS.
WILLIAM D. MURRAY
ROBERT A. TRACY

BY Edward J. Feeney Jr.
ATTORNEY

Dec. 9, 1969 W. D. MURRAY ET AL 3,483,537

BLOCK ORIENTED RANDOM ACCESS MEMORY WITH A TRAVELING DOMAIN WALL FIELD

Filed Nov. 23, 1966 7 Sheets-Sheet 5

INVENTOR.
WILLIAM D. MURRAY
BY ROBERT A. TRACY
Edward J. Feeney, Jr.
ATTORNEY

INVENTORS.
WILLIAM D. MURRAY
ROBERT A. TRACY
BY
Edward J. Feeney Jr.
ATTORNEY

United States Patent Office 3,483,537
Patented Dec. 9, 1969

3,483,537
BLOCK ORIENTED RANDOM ACCESS MEMORY WITH A TRAVELING DOMAIN WALL FIELD

William D. Murray, Franklin, Mich., and Robert A. Tracy, Castro Valley, Calif., assignors to Burroughs Corporation, Detroit, Mich., a corporation of Michigan
Filed Nov. 23, 1966, Ser. No. 596,706
Int. Cl. G11b 5/00
U.S. Cl. 340—174 12 Claims

ABSTRACT OF THE DISCLOSURE

A block oriented random access magnetic memory is disclosed which uses removable low cost storage media. The memory has speeds and capacities comparable to magnetic tape systems but without the mechanical motion usually associated with such systems. The memory organization utilizes the magnetic field associated with a traveling wall domain field along a magnetic rod to divide a removable data storage medium selectively into a plurality of magnetized areas corresponding to binary data.

A fixed structure of traveling wall domain rods with sense and write conductors is utilized in conjunction with a plurality of mechanically inserted magnetic storage units to provide a memory operationally similar to a magnetic tape unit with removable reels.

The present invention relates to magnetic memories. More particularly, it relates to a block oriented random access memory, with no mechanical motiton. It uses removable low cost storage media, with speeds and capacities comparable to magnetic tape systems.

Present day large capacity data storage systems generally employ magnetic storage devices in the form of tapes, drums, and disks. Data is usually stored on the surfaces of these devices. The data is recorded sequentially so that considerable scanning time is involved in any data retrieval. Scanning is normally accomplished by mechanical moton. Advanced present day systems have data storage densities in the 1000 to 2000 bits/inch range and minimum access time is on the order of 300 milliseconds.

Quite expectedly it requires utilization of radically different techniques than those presently employed to obtain a comparable storage system which does not employ mechanical motion. For example, in most present systems, a scanning head of the gap-type is utilzied as the scanning means for the system. The size of this scanning means is, of course, a critical factor in any scheme which attempts to increase storage density. Further still, the probe must have practically no dispersion and it must be capable of scanning a large number of storage cells in order to minimize the costs of selection. Also, the structural volume required per unit of stored data must be small. The storage system included in the present invention is of a type which satisfied the above stated requirements by utilizing a technique which uses a fixed structure of traveling wall domain rods and sense and write conductors with insertable magnetic storage media.

A co-pending application of the same inventors, assigned to the present assignee with U.S. Ser. No. 596,707 discloses various storage and traveling domain wall devices which may well be used in the present memory system. The teaching as well as the explanatory contents of that application regarding the operation of traveling domain rods or other devices is incorporated into this description by this reference.

Accordingly, it is a primary object of this invention to provide a new improved random access memory system.

It is another object of this invention to provide a data processing random access memory wherein the magnetic field associated with a traveling wall domain field along a magnetic rod is utilized to divide a data storage medium selectively into a plurality of magnetized areas corresponding to binary data.

It is a further object of this invention to provide a memory organization which includes concepts of multiplicity of magnetic storage elements for traveling domain wall rod with removable magnetic media, similar in total result to magnetic tape units with removable reels.

It is still further object of the present invention to provide a memory device which utilizes traveling wall domain motion as a means of replacing present day disk and rotating drum memories.

It is still another object of this invention to provide a storage device having a high data storage density per unit volume of storage medium which uses a fixed structure of traveling domain wall rods with sense and write conductors into which may be mechanically inserted magnetic storage media.

The present memory organization utilizes a serial access memory cell as a magnetic media which is replaceable without disturbing the electrical connections to the memory. The replacement is strictly a mechanical operation and the magnetic media may be removed without disturbing the stored data. Further, it can be replaced at a later time with the previously stored data still intact. Briefly, then, the memory organization disclosed herein provides the detailed disclosure of a block oriented random access memory including the information drive circuits, the domain drive circuits and the sense circuits, as well as the necessary interconnections between these circuits and the memory elements.

Additionally, the lack of mechanical rotation or other mechanical movement make possible a degree of reliability and long life heretofore unattainable.

These and other novel features of the invention together with further objects and advantages therefrom will become more apparent in the following detailed specification with reference to accompanying drawings in which.

Figure 3A:
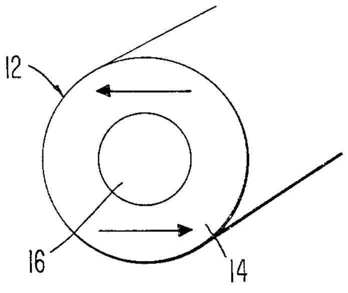
Figure 3B:
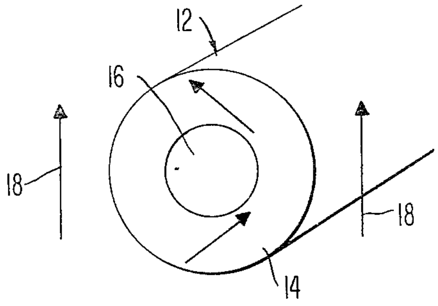

FIGS. 3A and 3B further represent a detailed illustration of the magnetic coated conductor in the absence and presence of the traveling domain wall field.

Figure 1:
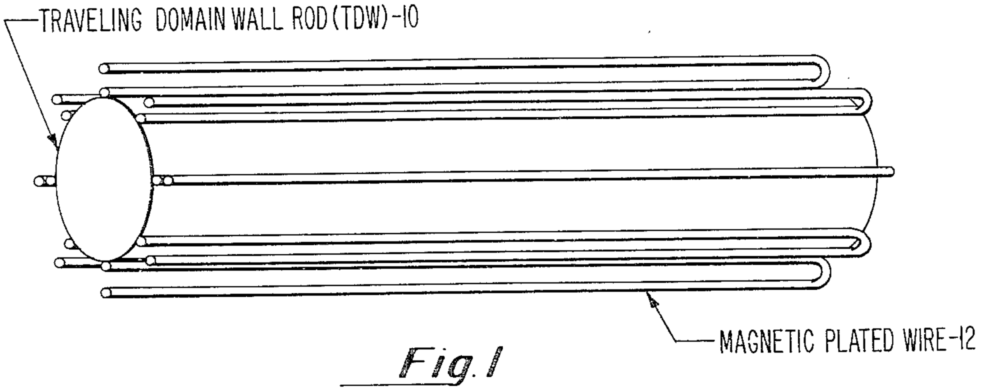
FIG. 1 is a first embodiment of the present invention. illustrating the multiple magnetic plated wired media set adjacent to the traveling domain wall rod.
Figure 2:
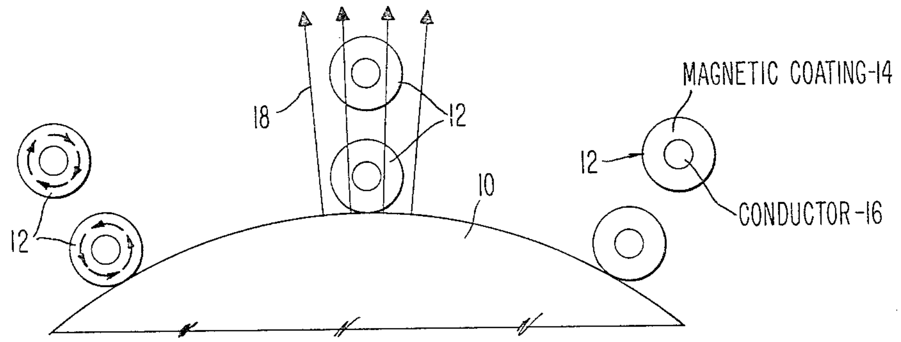
FIG. 2 is a detailed end view of the same structure.
Figures 4, 5:
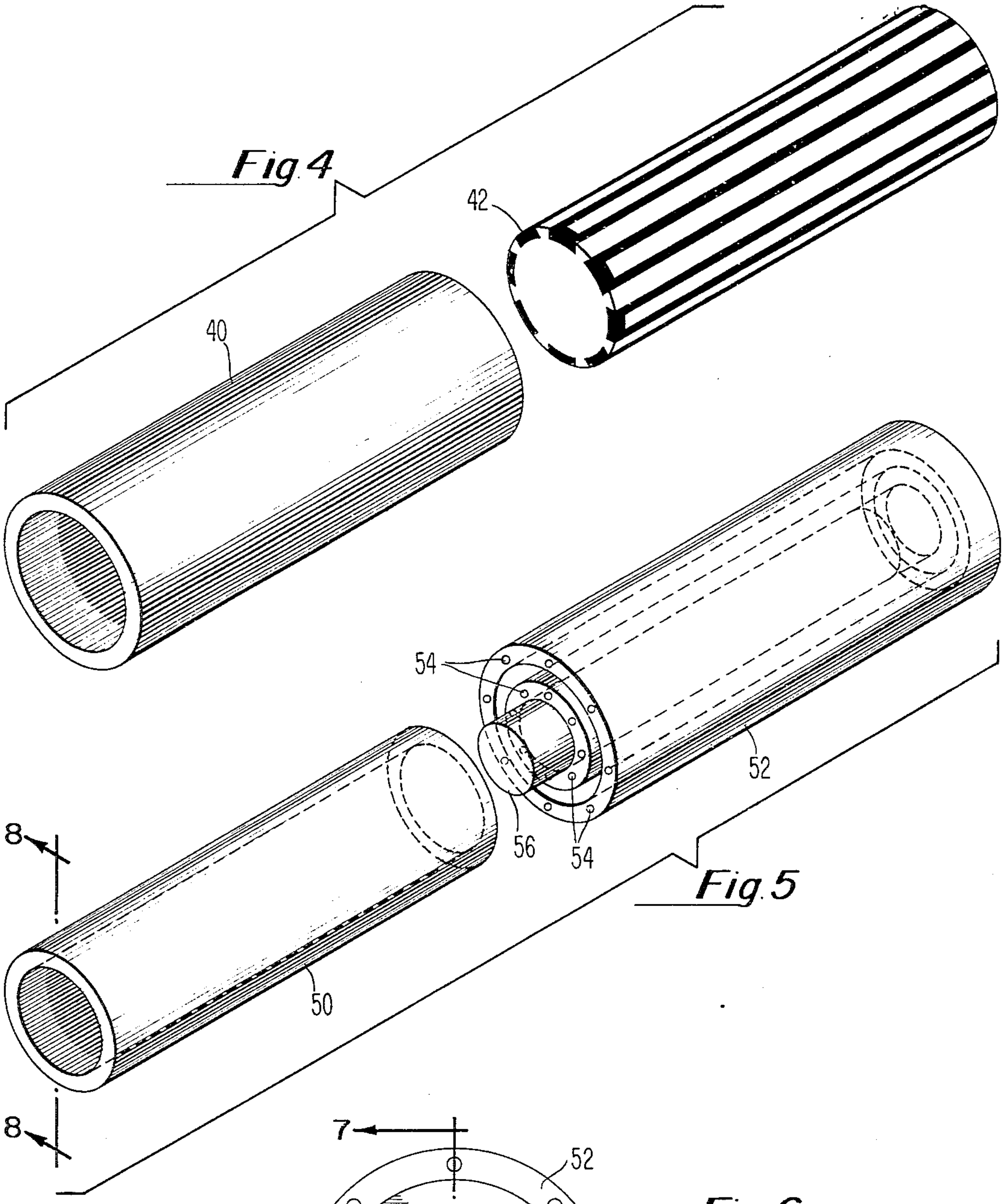

FIG. 4 illustrates another embodiment of the structure shown in FIGS. 1, 2, and 3. There is shown a storage media inserted in the center of the traveling domain wall tube.

FIG. 5 is an illustration of the preferred embodiment of the present invention. It uses a fixed structure of traveling domain rods and sense write conductors with an insertable magnetic storage media.

Figure 6:
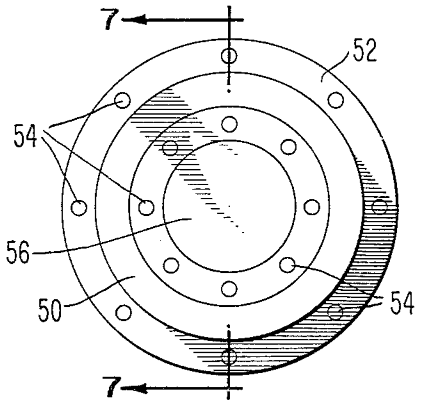

FIG. 6 is a detailed end view of the FIG. 5 embodiment.

Figure 7:
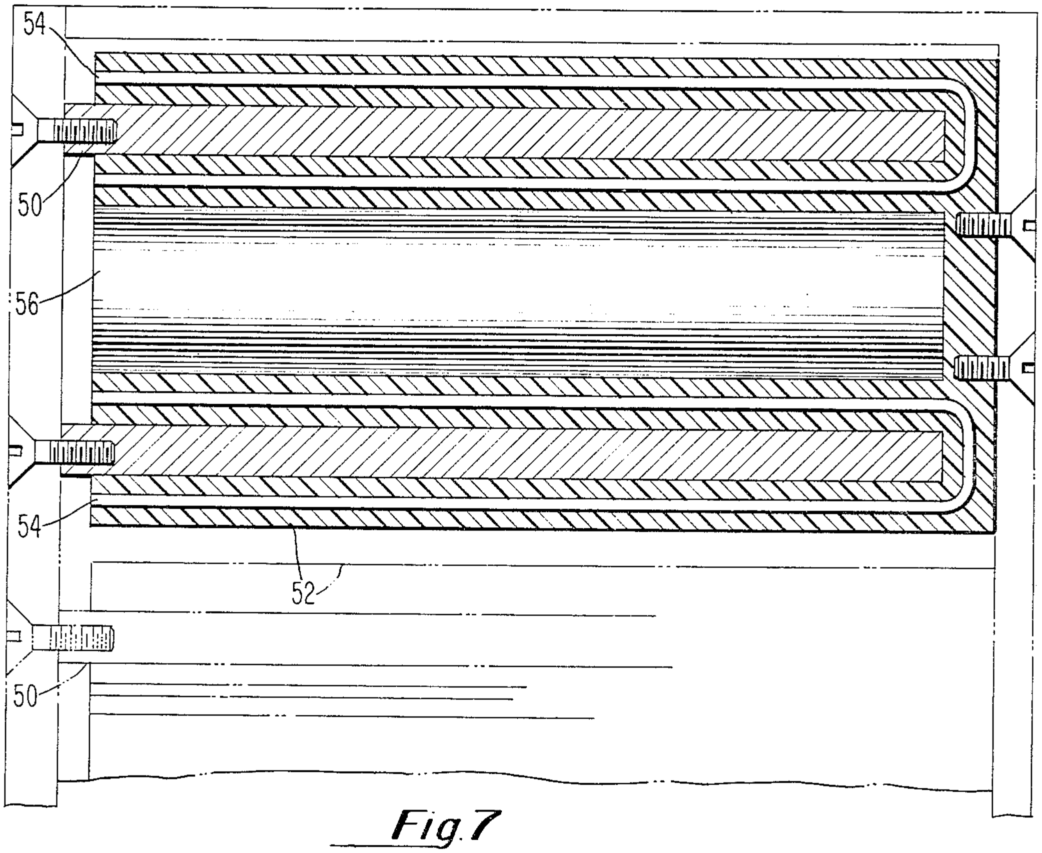

FIG. 7 is a sectional view of FIG. 5.

Figure 8:
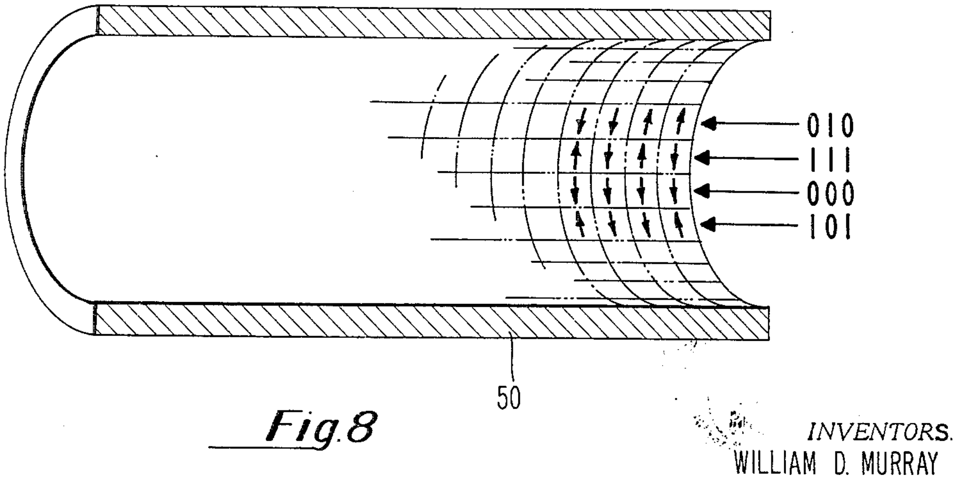

FIG. 8 is a sectional view of the insertable magnetic storage media utilized in the embodiment of FIG. 5.

Figure 9:
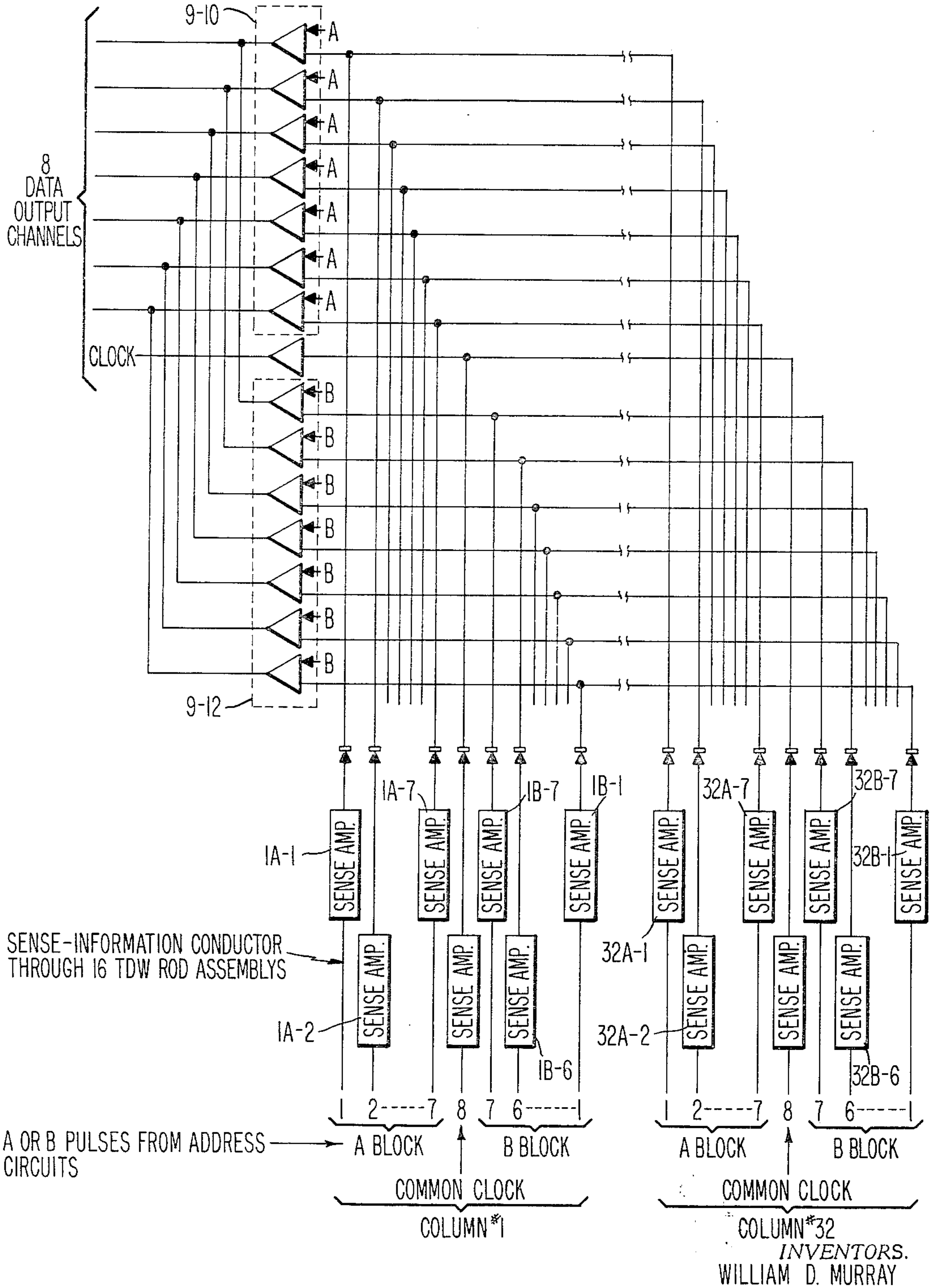

FIG. 9 is a logical schematic diagram of the sense circuitry of the present memory.

Figure 10:
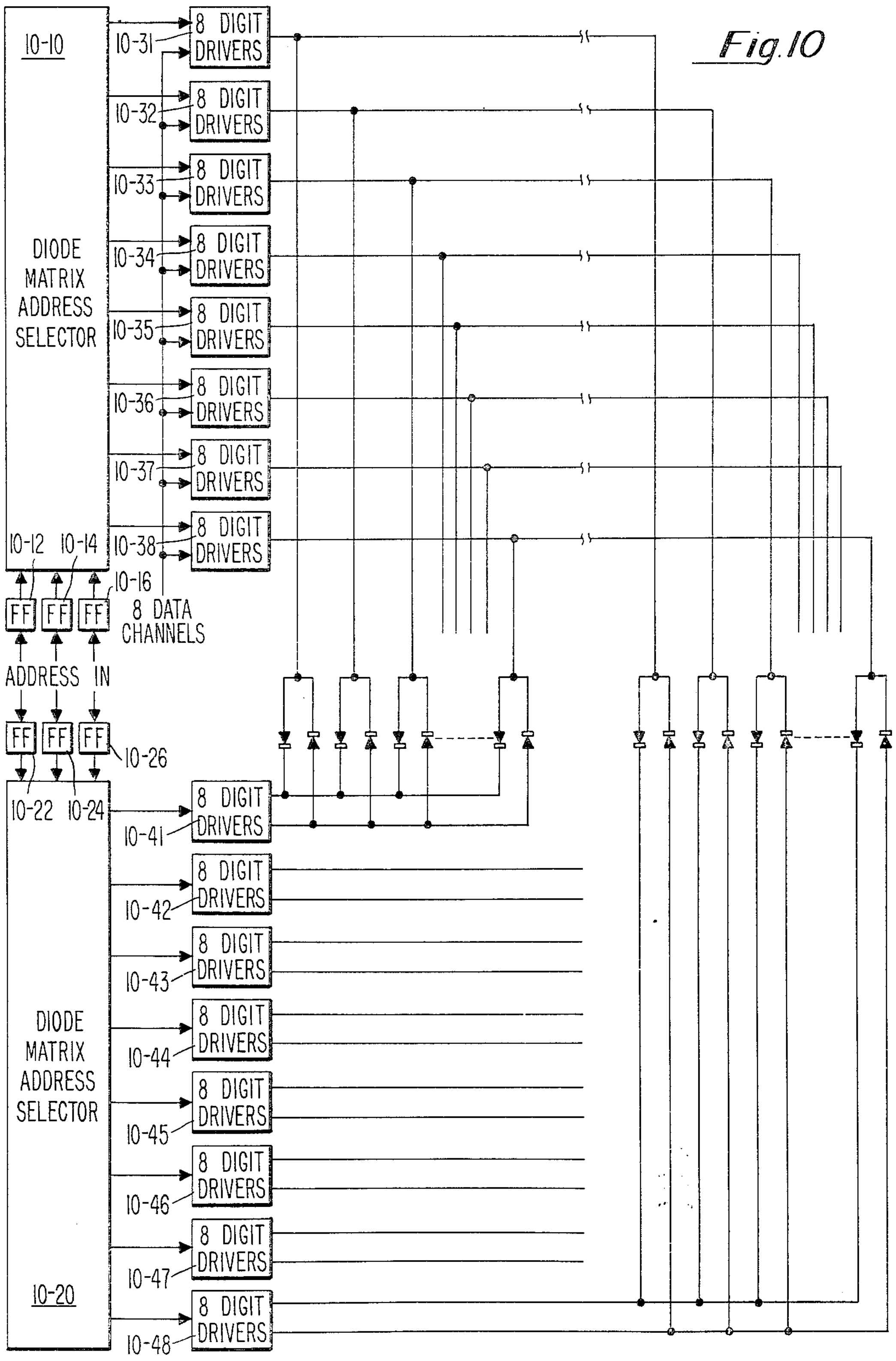

FIG. 10 is also a logical schematic diagram of the information drive circuitry used in the present memory.

Figure 11:
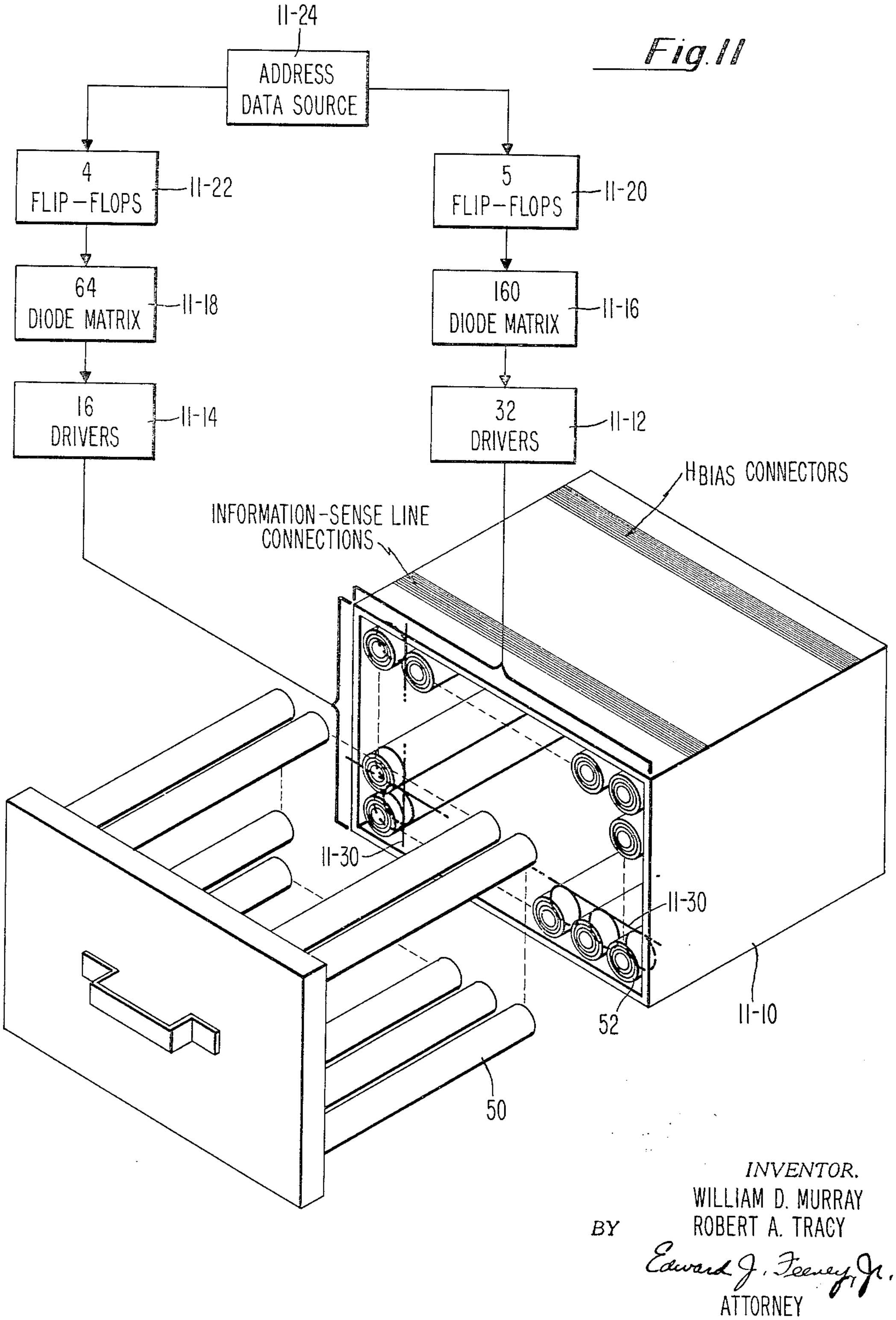

FIG. 11 is a block diagram of the domain drivers used in this invention.

Figure 12:
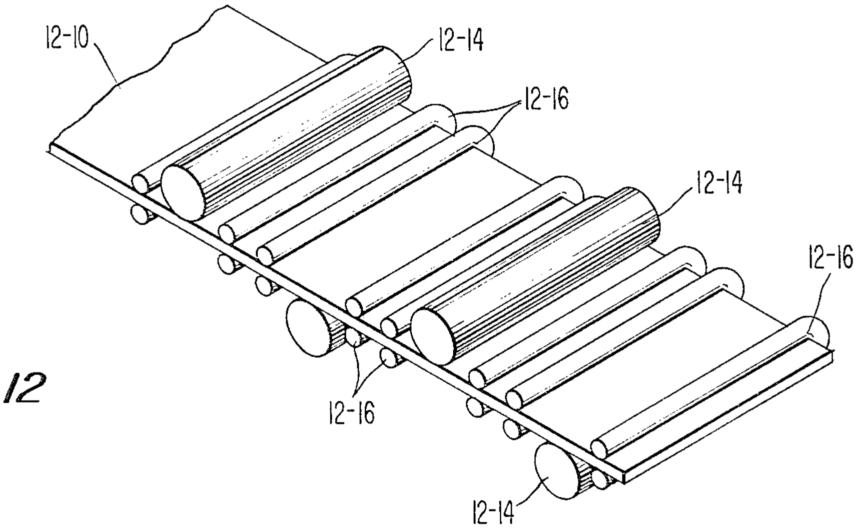

FIG. 12 is an illustration of a single sheet storage structure in an additional embodiment.

Figure 13:
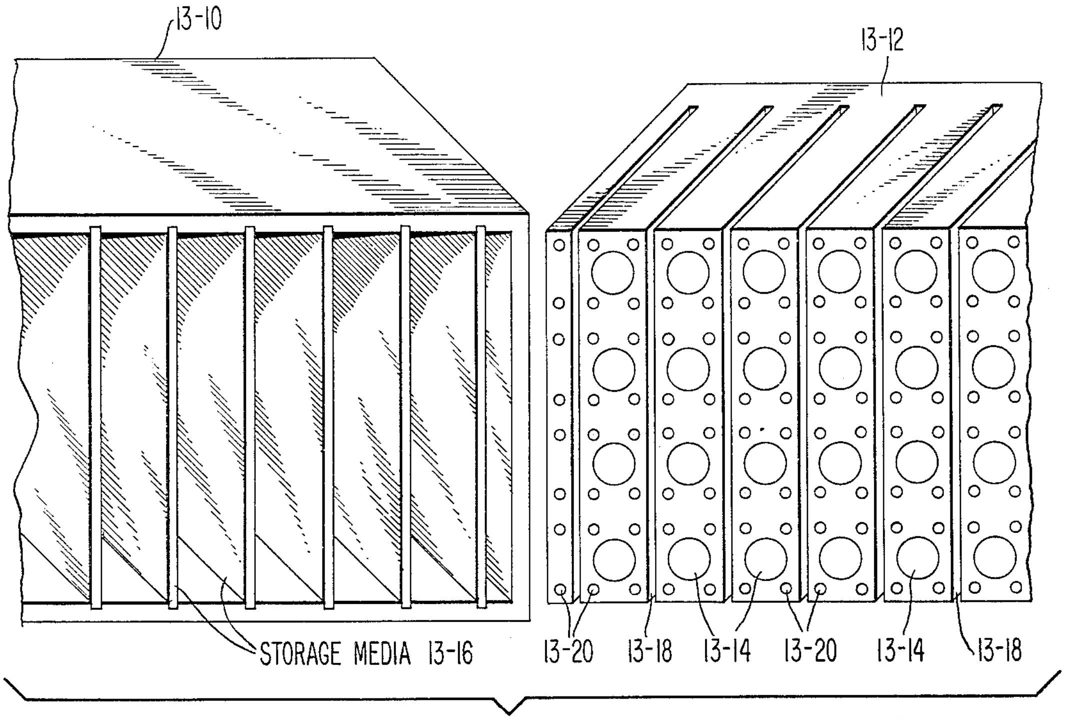

FIG. 13 is an exploded view of a proposed memory structure using removable flat memory sheets with the rod structure removed and folded to the right.

Referring in particular to FIG. 1, there is illustrated a plurality of magnetic plated wires positioned about the outside circumference of the traveling domain wall rod 10. Each of the magnetic plated wires 12 includes a central electrical conductor with a magnetic coating thereon. This concept requires that the magnetic material be perturbed by the traveling domain wall magnetic field. It also requires that the magnetic material be switched by the combination of fields due to the domain wall field and the field created by the current through the central wire conductor.

This wire 12 is more clearly illustrated in FIG. 2 wherein the structure is illustrated in cross-section. Here the magnetic plated wire 12 is shown having a central conductor 16 with a magnet coating 14 plated thereupon. The combination is then subjected to the magnetic field created by the traveling domain wall down the rod. Further, the magnetic coating 14, which is the storage medium for the information, is also subjected to the magnetic field created by the current through the central conductor 16.

In FIGS. 3A and 3B, the arrows illustrate the effect of the magnetized portions of the magnetic plated wire 12. Thus, the central conductor 16 with the magnetic coating 14 thereon is illustrated first in FIG. 3A without the presence of either magnetic field but illustrating a remanent magnetic flux. In FIG. 3B, however, the presence of the traveling domain wall field 18 is shown effecting the remanent flux of the magnetic plated wire 14.

FIG. 4 illustrates a variation of the technique utilized in the embodiment shown in FIG. 1. In this embodiment, a traveling domain wall portion of the embodiment is shown in the form of a hollow tube 40. Thus, rather than having a solid traveling domain wall (TDW) rod, as that shown in FIG. 5, a hollow tube is utilized. Into this hollow tube there is inserted a magnetic storage media 42. The magnetic storage media is created by having the conductors plated upon the surface of the inserted portion of the structure. This embodiment, of course, has a higher degree of rigidity and thus makes for a better mechanical structure than that illustrated in FIG. 1.

In FIG. 5 there is shown a preferred embodiment of the present invention. In this configuration the traveling domain wall element is again a solid rod as it was in the first illustration. This magnetic domain wall rod 56 is mounted in a housing 52 in a fixed structural relationship with the magnetic conductors 54. The magnetic storage media 50 is insertable into this structure 52.

FIG. 6 illustrates an end view of the structure of FIG. 5. In this figure the magnetic domain wall rod 56 is shown inserted in the center of the surrounding structure housing 52. Within this structure are mounted the fixed conductors 54. These conductors are positioned at specified locations about the circumference of the magnetic domain wall rod 56. The magnetic storage media 50 is then inserted between the folded conductors 54.

FIG. 7 is a cross-sectional view of the preferred embodiment illustrated in FIG. 5. Thus, there is shown, in greater detail, the relationship between the conductors 54, the magnetic domain rod 56 and the inserted magnetic storage media 50.

FIG. 8 is a pictorial illustration of a cross-sectional view of the magnetic storage media 50, showing a plurality of storage locations. The actual storage device proposed includes two complete 7 bit characters per storage element length plus a clock channel and a spare. Each cylinder 50 is 1 block (4000 bits) long. At 1000 bits/inch (NRZ), each storage cylinder is approximately four inches long. For a total of 512 rods, a rectangular array of 16 x 32 would be most appropriate. Reading the top row, four arrows are depicted. The first two are in a downward direction and the remaining to in the upward direction. Since as between the first two arrows there is no reversal in direction, a binary zero (0) is represented. However, between the second and third arrows along the top row there is a reversal in direction and this represents a binary one (1). Again, between the third and fourth arrows in the top row, there is no reversal and consequently a binary zero (0) is represented. In the second row, there is illustrated a reversal of direction between every two arrows. This, of course, illustrates a series of binary ones as shown. In the third row, there is no reversal whatsoever, as all four arrows are in a downward direction. This represents a series of binary zeros and is so denoted. In the fourth row, there is shown a reversal direction between the first two and the last two arrows without any reversal as between the second and third arrows. This corresponds to a binary notation of 101.

Consider next FIG. 9 which illustrates the sense or read structure of a memory system. The memory system to be considered includes a matrix of thirty-two columns and sixteen rows. Each of the columns contains a first and a second group (A and B) of seven bit lines each. In each column a total of sixteen sense amplifiers are used, however, only fifteen are shown, since one is a spare. Of the fifteen, a first group of seven comprise an A block and a second group of seven are denoted the B block. The remaining amplifier is used in one clock system. In column 1, for example, sense amplifiers 1A–1 to 1A–7 comprise the seven sense amplifiers of block A. Another seven sense amplifiers 1B–1 to 1B–7 comprise the units of block B. And a clock sense amplifier 8 is common to both blocks A and B. The output signals from all thirty-two columns of block A amplifiers are commonly connected to a group of seven AND gates 9–10. Likewise, the output signals from all thirty-two columns of block B amplifiers are commonly connected to a second group of AND gates 9–12. Finally, the corresponding output lines of the two groups of AND gates 9—10 and 9—12 are parallel connected together to provide a plurality of seven data output channels. A clock output signal completes the group of the eight data output channels shown.

FIG. 10 illustrates the Information drive circuit of the System. A first and a second group of three binary input signals provide the input address to the drive circuitry. One group of three are respectively applied to three flipflop (FF) circuits 10–12, 10–14 and 10–16. The second group of three input address signals are similarly applied to three FF circuits 10–22, 10–24, and 10–26. Each FF provides two output signals to a diode matrix address selector 10–20. From each of the address selectors 10–10 and 10–20 a plurality of eight lines are individually connected to a bank of eight digit drivers. For example, each of the eight output lines from the address selector 10–10 is connected to a group of eight digit drivers 10–31, 10–32, 10–33, 10–34, 10–35, 10–36, 10–37, and 10–38. Similarly, each of the eight output lines from the address selector 10–20 is connected to the second group of eight banks of eight digit drivers each 10–41, 10–42, 10–43, 10–44, 10–45, 10–46, 10–47 and 10–48.

Thus, the information drivers would, in a manner similar to the sense amplifiers be connected to a column of sense-information lines. If the scheme shown in FIG. 10 is used, the resulting structure uses 128 information drivers, since two groups of 64 drivers each are utilized. It is important to note that the use of a pair of oppositely poled diodes in conjunction with each of the sense information conductors through the sixteen traveling domain wall rod structures is necessitated by the use of a bipolar information signal. Thus, if the input signal is in a negative direction, one of the diodes is conductive whereas, if the input signal is positive, the other diode of the pair will conduct.

FIG. 11 illustrates the domain driver system used in the memory configuration of sixteen rows and thirty-two columns. The drivers which initiate the travel of a domain wall in each of the rods will be operated in a coincident current mode. This provides the address of two blocks of data. Selection of one of these two blocks is accomplished in the sense amplifier and information driver circuits previously described in FIGS. 9 and 10 respectively. In the 16 x 32 configuration, a total of forty-eight domain drivers are utilized. In addition to these drivers, address circuitry is also required. This includes a sixty-four diode matrix and nine flipflops. They operate as follows:

The traveling domain wall stack 11–10 includes a plurality of five hundred and twelve (512) rods arranged in a 16 x 32 matrix. The address data source 11–24 is concurrently applied to a group of five flipflops 11–20 and a group of four flipflops 11–22. The output signals from the five flipflops 11–20 are simultaneously applied to the 160 diode selection matrix 11–16. At the same time, the output from the four flipflops 11–22 is applied to a 64 diode selection matrix 11–18. The combination of a group of the five flipflops 11–20 with a 160 diode matrix 11–16 is capable of driving any one of a group of thirty-two drivers 11–12. Similarly, the operation of the 64 diode matrix 11–18 by the group of four flipflops 11–22 provides the group of sixteen (16) drivers 11–14 with the necessary selective drive signals to operate, in conjunction with the signals from the drivers 11–12, the 512 rod stack 11–10.

FIGURE 12 illustrates an additional embodiment of the present invention showing the removable storage medium as a single flat sheet. In this configuration, a basic flat storage medium 12–10 has positioned along its length a plurality of perpendicular elements. These elements comprise a plurality of traveling domain wall rods 12–14. Adjacent each of these rods is a plurality of write-sense conductors 12–16. These write-sense conductors are folded over the edge of the flat storage sheet 12–10. While this overall structural configuration is most likely not the ultimate in economy, it provides, probably the lowest cost for removable storage media. Two blocks of data per rod seem reasonable using this configuration and this would require 512 rods. However, the structure can be opened like a waffle iron, the media 12–10 inserted and registered on location pins, and then closed for operation. If a single layer were used this structure would approximate a size of fifty by thirty by two inches. However, if two layers were utilized, this size would be twenty-five by thirty by four inches.

For a structure which would provide the most economical component count, a multiple sheet storage structure, such as is shown in FIGURE 13, is preferred. However, for this configuration, the fabrication costs would probably be higher than those for the single sheet storage shown in the previous figure.

In this configuration, a rod structure 13–12 is shown folded away from the frame 13–10 which houses the plurality of storage sheets 13–16. In the operative condition, the rod structure 13–12 would be inserted into the frame 13–10 with the storage sheets 13–16 positioned within the slots 13–18. Each of the storage media sheets 13–16 would be held within the frame on three sides for location stability.

Other useful structures can be obtained if the traveling domain wall phenomena can be controlled in non-rod media, such as tubes, elliptical bars and tapes.

While there has been shown and described the fundamental novel features of the invention as applied to the preferred embodiments, it will be understood that various omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. A block oriented random access memory system comprising a traveling domain wall rod matrix having Y rows and X columns, a rod selection and activation means coupled to said Y rows and X columns, a sense-write means serially coupled to each of the rods in each of the columns of said matrix, and a plurality of magnetic storage cylinders individually positioned on each of said rods to receive and store along its length information sequentially applied to the write means for subsequent serial sensing by said sense means wherein cylinders are readily replaceable without disturbing the electrical connections to said memory.

2. The block oriented random access memory system as set forth in claim 1, wherein each of said magnetic storage cylinders includes a plurality of storage elements arranged in a plurality of circumferential rings sequentially positioned along the length of said cylinder.

3. The block oriented random access memory as set forth in claim 1 wherein said sense-write means includes a plurality of electrical conductors separately arranged in a longitudinally adjacent manner to each of the traveling domain wall rods and individually positioned about the circumference thereof.

4. The block oriented random access memory as set forth in claim 1 wherein said rod selection and activation means comprises an individual electrical conductor associated with each of the Y rows and each of the X columns, with each of the column conductors circularly looping each of the rods in the column and each of the row conductors circularly looping each of the rods in the row to enable each rod in the matrix to be selected by the coincidence of current flow through its column and row conductors.

5. A memory cell for a block oriented random access memory comprising a traveling wall domain rod, a plurality of magnetic plated wire storage conductors arranged about the circumference of the rod, each of said conductors being positioned longitudinally adjacent to said rod for sequential storage along the length of the magnetic plating thereon, a domain wall starting coil coupled to said domain rod for initiating the travel of a domain wall along said rod, a plurality of information sources respectively connected to said plurality of conductors during a write operation and a plurality of sense amplifiers respectively connected to said plurality of conductors during a read operation, the concurrence of successive signals from said information sources and the signal emanating from the traveling domain wall causing information to be written at successive longitudinal locations along said plated conductors and the occurrence of the traveling domain wall signal alone causing the previously written information to be sequentially sensed through perturbation of the stored information.

6. A memory cell for a block oriented random access memory comprising a traveling wall domain rod, a plurality of conductors arranged about the circumference of the rod, each of said conductors being positioned longitudinally adjacent to said rod, a cylindrical storage tube having the domain rod insertably mounted therein and the conductors insertably mounted therein and folded thereover, a domain wall starting coil coupled to said domain rod for initiating the travel of a domain wall along said rod, a plurality of information sources respectively connected to said plurality of conductors during a write operation and a plurality of sense amplifiers respectively connected to said plurality of conductors during a read operation, the concurrence of successive signals from said information sources and the signal emanating from the traveling domain wall causing information to be written at successive longitudinal, circumferential locations along said cylindrical storage tube and the occurrence of the traveling domain wall signal alone causing the previously written information upon said storage tube to be sequentially sensed through perturbation of the stored information.

7. A magnetic memory organization comprising a plurality of traveling domain rods arranged in a fixed interrelationship with each other in a first matrix-like structure, a plurality of electrical conductors symmetrically positioned about each of said rods such that each of said conductors is parallel with and longitudinally adjacent to said rod, a plurality of cylindrical magnetic storage media also arranged in a fixed interrelationship with each other in a second matrix-like structure to enable said plurality of cylindrical magnetic storage media of the second structure to be simultaneously inserted into and removed from the first matrix-like structure, sense/write means connected to the conductors in each of the columns of said first matrix-like structure and traveling domain wall initiating means connected to each of the rods of the matrix-like structure in a coincident-current type selection connection to selectively initiate a traveling domain wall along any one of said plurality of rods.

8. A block oriented random access memory comprising a plurality of traveling domain rods arranged in a fixed interrelationship with each other in a first matrix-like structure, a plurality of electrical conductors positioned about each of said rods such that each of said conductors is parallel with and longitudinally adjacent to said rod, a plurality of cylindrical magnetic media, equal in number to said traveling domain rods, also arranged in a fixed interrelationship with each other in a second matrix-like structure to enable said plurality of cylindrical magnetic media of the second structure to be simultaneously inserted into and removed from the first matrix-like structure, a plurality of information sources respectively connected to said plurality of conductors during a write operation and a plurality of sense amplifiers respectively connected to said plurality of conductors during a read operation, the concurrence of successive signals from said information sources and the signal emanating from the traveling domain wall causing information to be written at successive longitudinal locations along said plated conductors and the occurrence of the traveling domain wall signal alone causing the previously written information to be sequentially sensed through perturbation of the stored information.

9. A block oriented random access memory comprising a tape storage member with information segments on the surface thereof, a plurality of traveling wall domain rods and a plurality of conductors associated with each of said rods, said traveling domain rods positioned at fixed intervals along and perpendicular to the length of said tape storage member surface, and their associated conductors folded over said tape storage member in a corresponding perpendicular manner longitudinally adjacent to said rods.

10. The block oriented random access memory as set forth in claim 9 wherein said tape storage member is repeatedly folded back upon itself lengthwise to place the successively positioned rod in a plurality of planes one upon the other in a waffle-iron like structure.

11. A block oriented random access memory comprising a storage media housing having removably positioned therein a plurality of flat sheets of storage material each having information stored thereon, a traveling domain wall rod structure with a plurality of slotted portions, a plurality of traveling wall domain rods and a plurality of conductors mounted in said structure adjacent to said slotted portions, said rod structure insertably positioned within said storage media housing during operation of said memory such that the removable flat sheets of storage material are located within the slotted portions of said rod

12. The block oriented random access memory as set forth in claim 11 wherein said flat storage sheets are mounted in and removable from said storage media housing in a drawer-like arrangement.

References Cited

UNITED STATES PATENTS

| | | | |
|---|---|---|---|
| 3,140,471 | 7/1964 | Fuller | 340—174 |
| 3,151,316 | 9/1964 | Bobeck | 340—174 |
| 3,295,114 | 12/1966 | Snyder | 340—174 |
| 3,320,596 | 5/1967 | Smith et al. | 340—174 |

BERNARD KONICK, Primary Examiner.

BARRY L. HALEY, Assistant Examiner

PO-1050
(5/69)

UNITED STATES PATENT OFFICE
CERTIFICATE OF CORRECTION

Patent No. 3,483,537 Dated December 9, 1969

Inventor(s) William D. Murray and Robert A. Tracy

It is certified that error appears in the above-identified patent and that said Letters Patent are hereby corrected as shown below:

Column 3, line 70, after "remaining", "to" should be changed to read -- two --.

Column 8, line 23, after "rod" the last three lines of this claim were omitted and should read as follows: -- structure enabling the magnetic field from a wall domain traveling down each of said rods to sequentially access information stored on said flat sheets adjacent said rods. --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents